United States Patent
Yi et al.

(10) Patent No.: US 9,408,250 B2
(45) Date of Patent: Aug. 2, 2016

(54) WIRELESS NETWORKS FOR HIGHLY DEPENDABLE APPLICATIONS

(75) Inventors: Yunjung Yi, St. Louis, MO (US); Vicraj T. Thomas, Golden Valley, MN (US); Kelly P. Muldoon, Minneapolis, MN (US); Michael R. Franceschini, Centerport, NY (US)

(73) Assignee: Honeywell International Inc., Morris Plains, NJ (US)

( * ) Notice: Subject to any disclaimer, the term of this patent is extended or adjusted under 35 U.S.C. 154(b) by 2371 days.

(21) Appl. No.: 12/246,370

(22) Filed: Oct. 6, 2008

(65) Prior Publication Data

US 2009/0097468 A1 Apr. 16, 2009

Related U.S. Application Data

(60) Provisional application No. 60/978,368, filed on Oct. 8, 2007.

(51) Int. Cl.
*H04W 4/00* (2009.01)
*H04W 84/18* (2009.01)
(Continued)

(52) U.S. Cl.
CPC .............. *H04W 84/18* (2013.01); *G01D 21/00* (2013.01); *G08C 17/02* (2013.01); *G08C 2201/40* (2013.01); *G08C 2201/50* (2013.01); *G08C 2201/63* (2013.01); *H04W 74/04* (2013.01)

(58) Field of Classification Search
USPC .................. 370/278, 279, 282, 328, 333, 332; 455/8, 9, 10, 15, 13.1, 13.3, 16; 375/211, 212
See application file for complete search history.

(56) References Cited

U.S. PATENT DOCUMENTS

| 5,166,953 | A | 11/1992 | Hershey et al. |
| 5,311,541 | A | 5/1994 | Sanderford, Jr. |

(Continued)

FOREIGN PATENT DOCUMENTS

| EP | 1717962 | | 11/2006 |
| GB | 2259226 | A * | 3/1993 |
| WO | 2005010214 | | 2/2005 |

OTHER PUBLICATIONS

Rao, Shreharsha, "Implementing a Bidirectional Frequency Hopping Application with TRF6903 and MSP430", "Application Report", Sep. 2004, vol. SWRA041, Publisher: Texas Instruments.

(Continued)

*Primary Examiner* — Zewdu A Beyen
(74) *Attorney, Agent, or Firm* — Fogg & Powers LLC (57) ABSTRACT

A wireless communication system comprises one or more control units operable to transmit control signals, a plurality of actuators responsive to the control signals, and a plurality of sensors operable to transmit sensor data used by the one or more control units in generating the control signals. Each of the sensors, actuators, and one or more control units are located at a fixed position in the system relative to one another. Each of the plurality of sensors and each of the plurality of actuators are coupled to at least one of the one or more control units via a plurality of wireless paths. Each of the plurality of sensors are operable to transmit the sensor data in an assigned time slot to at least one of the one or more control units over a plurality of wireless channels in each of the plurality of wireless paths. The number of channels in each of the plurality of wireless paths is determined based, at least in part, on a worst-case estimate of potential interference, and each of the plurality of sensors is operable to pseudo-randomly switch the plurality of channels over which the sensor data is transmitted.

16 Claims, 7 Drawing Sheets

(51) Int. Cl.
  *G01D 21/00* (2006.01)
  *G08C 17/02* (2006.01)
  *H04W 74/04* (2009.01)

(56) References Cited

U.S. PATENT DOCUMENTS

| | | | |
|---|---|---|---|
| 5,859,874 A * | 1/1999 | Wiedeman et al. | 375/267 |
| 5,970,055 A | 10/1999 | Park et al. | |
| 6,169,761 B1 | 1/2001 | Marcoccia et al. | |
| 6,658,850 B1 | 12/2003 | House et al. | |
| 6,697,415 B1 | 2/2004 | Mahany | |
| 6,865,215 B1 | 3/2005 | Russell et al. | |
| 6,950,627 B2 | 9/2005 | Vicari | |
| 6,963,599 B1 | 11/2005 | Dunn | |
| 6,990,319 B2 | 1/2006 | Wright et al. | |
| 7,336,695 B1 | 2/2008 | Hendershot | |
| 2002/0075830 A1 * | 6/2002 | Hartman, Jr. | 370/333 |
| 2003/0189638 A1 | 10/2003 | Fry | |
| 2005/0065743 A1 | 3/2005 | Cumming et al. | |
| 2005/0275529 A1 * | 12/2005 | Kates | 340/539.22 |
| 2006/0140251 A1 | 6/2006 | Brown et al. | |
| 2008/0019422 A1 | 1/2008 | Smith et al. | |
| 2008/0112360 A1 | 5/2008 | Seidel et al. | |

OTHER PUBLICATIONS

European Patent Office, "European Search Report", Jan. 14, 2009, Published in: EP.

Canadian Patent Office, "Office Action for Canadian Patent Application No. 2,640,815", "from Foreign Counterpart to U.S. Appl. No. 12/246,370", Apr. 15, 2015, pp. 1-3, Published in: CA.

Canadian Patent Office, "Notice of Allowance from Canadian application No. 2,640,815", "from foreign counterpart of U.S. Appl. No. 12/246,370", Feb. 22, 2016, pp. 1-1, Published in: CA.

European Patent Office, "European Search Report from European application No. 081659922", "from foreign ,munterpart of U.S. Appl. No. 12/246,370", Mar.16, 2016, pp. 1-4, Published in: EP.

European Patent Office, "Office Action from EP Application No. 08165992.2 mailed Apr. 06, 2016", "from Foreign counterpart of U.S. Appl. No. 12/246,370", Apr. 6, 2016, pp. 1-5, Published in: EP.

* cited by examiner

WIRELESS NETWORKS FOR HIGHLY DEPENDABLE APPLICATIONS

This application claims the benefit of and priority to U.S. Provisional Patent Application Ser. No. 60/978,368 (entitled "WIRELESS NETWORKS FOR HIGHLY DEPENDABLE APPLICATIONS") filed on Oct. 8, 2007 and which is referred to herein as the '368 Application and incorporated by reference in its entirety.

This application is related to the following United States patent applications, all of which are hereby incorporated herein by reference:

U.S. patent application Ser. No. 12/246,365 (entitled "SYSTEM AND METHODS FOR SECURING DATA TRANSMISSIONS OVER WIRELESS NETWORKS") filed on even date herewith and which is referred to herein as the '602 Application; and U.S. provisional patent application Ser. No. 60/978,365 (entitled "ROBUST WIRELESS SIGNALING METHODS TO DEFEAT JAMMING INTERFERENCE IN STATIONARY TOPOLOGY WIRELESS NETWORKS") filed on Oct. 8, 2007 and which is referred to herein as the '365 Application.

BACKGROUND

Modern vehicles, such as aircraft, automobiles, space craft, satellites, etc., use computer networks to control operation of the vehicle. Similarly, modern industrial control plants, campus buildings, etc. use computer networks for control of operations. For example, sensor data and/or control inputs from an operator are provided to a processing unit for processing. Typically, the components of these networks in modern vehicles and buildings are interconnected via wires. However, wires increase production and maintenance costs associated with the vehicles and buildings. For example, designers must take into consideration space for the wires in designing a vehicle and manufacturers must ensure that the wires are properly connected. In addition, if a component needs to be upgraded or added, new wires may also need to be added or replaced. Furthermore, wires increase the weight of a vehicle which is a consideration for flying vehicles such as aircraft and spacecraft.

Hence, it is desirable to replace the wired networks with wireless networks. Unfortunately, unlike wired networks, where wired lines can protect communication and provide some degree of guaranteed reliability, wireless networks use broadcast medium which can be easily interfered/corrupted by intentional or unintentional sources. Also, the quality of wireless medium can be affected by surrounding environments. For example, wireless networks in indoor environments generally experience multi-path fading, shadowing and some obstacles by humans. Any wireless vehicle network for essential services needs to handle unpredictable and dynamic link quality and reliability. In addition, certain wireless networks, such as in aircraft, must meet certain required levels of reliability.

SUMMARY

In one embodiment a wireless communication system is provided. The wireless communication system comprises one or more control units operable to transmit control signals, a plurality of actuators responsive to the control signals, and a plurality of sensors operable to transmit sensor data used by the one or more control units in generating the control signals. Each of the sensors, actuators, and one or more control units are located at a fixed position in the system relative to one another. Each of the plurality of sensors and each of the plurality of actuators are coupled to at least one of the one or more control units via a plurality of wireless paths. Each of the plurality of sensors are operable to transmit the sensor data in an assigned time slot to at least one of the one or more control units over a plurality of wireless channels in each of the plurality of wireless paths. The number of channels in each of the plurality of wireless paths is determined based, at least in part, on a worst-case estimate of potential interference, and each of the plurality of sensors is operable to pseudo-randomly switch the plurality of channels over which the sensor data is transmitted.

DETAILED DESCRIPTION

The embodiments described below utilize new techniques incorporating wireless network technologies to achieve low bit error rate (e.g., $10^{-6}$ or $10^{-9}$) and low packet error rate. In particular, the embodiments described below utilize techniques at multiple layers (e.g., network layer, physical layer, data link layer, etc.) to increase reliability and resilience to jamming. In particular, the embodiments described below utilize multi-path routing (also referred to as route diversity or path diversity), multiple channels for each path at the link layer (also referred to as link diversity or frequency diversity) and multiple redundant copies of transmitted data (also referred to as time diversity) to achieve necessary low error rates.

Figure 1A:
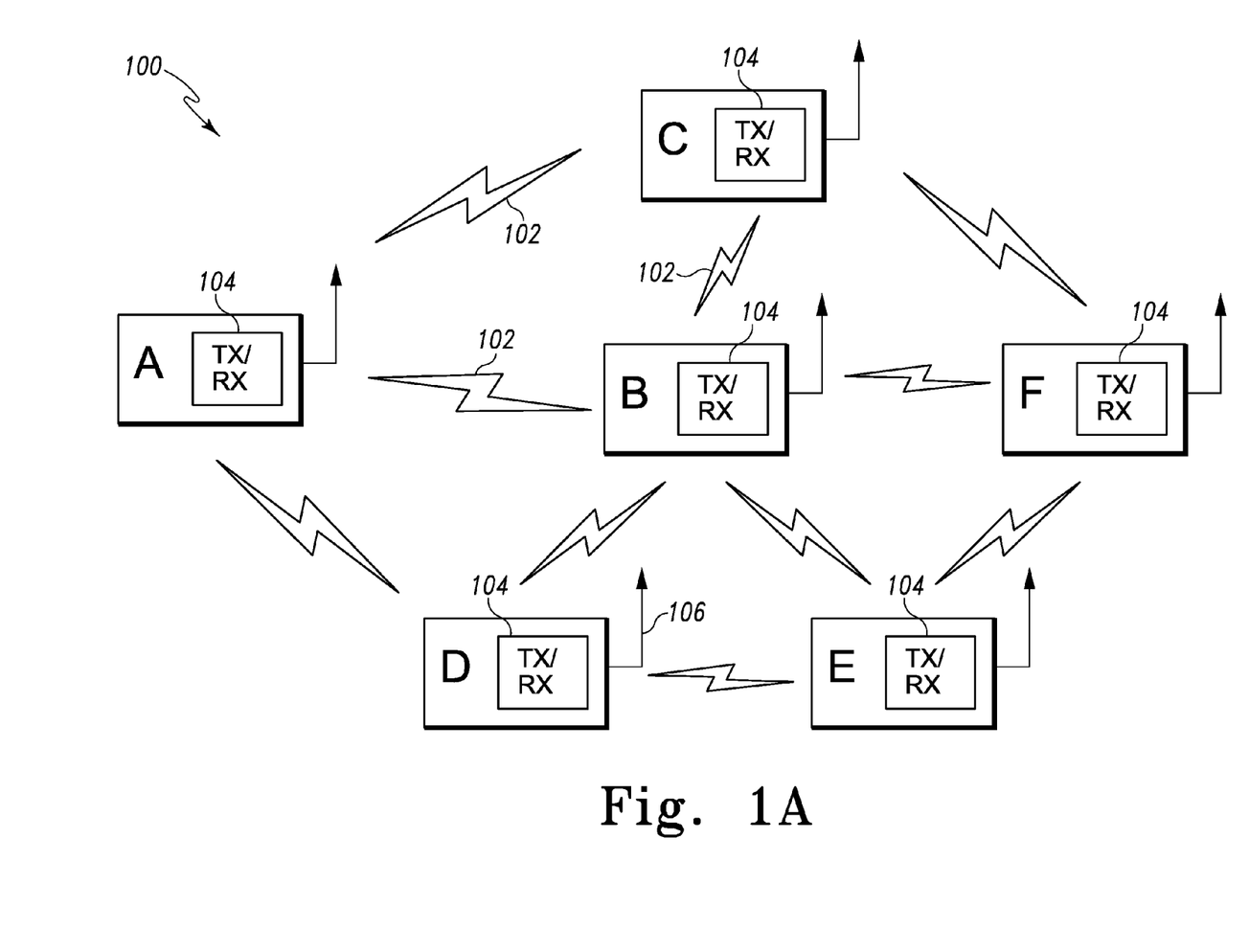

FIG. 1A is a block diagram of one embodiment of a wireless communication system 100. Wireless communication system 100 includes a plurality of nodes A-F. Although only six nodes are depicted in this embodiment, for purposes of explanation, it is to be understood that any number of nodes can be used in other embodiments. Each of nodes A-F includes a transmitter/receiver pair or transceiver (TX/RX) 104 and an antenna 106. Hence, each of nodes A-F is operable to receive and transmit wireless communication signals. For example, each of nodes A-F is operable to transmit in an assigned Time-Division Multiple Access (TDMA) time slot in this example. However, it is to be understood that other techniques such as Carrier Sense Multiple Access (CSMA) or Code Division Multiple Access (CDMA) can be used in other embodiments.

Each of nodes A-F is located within range of at least two other nodes via wireless links 102. For example, node A is in range of and coupled to nodes B, C, and D via wireless links 102. In addition, each of nodes A-F is operable to forward received signals that have a destination address indicating another node. Furthermore, each of nodes A-F is located in a fixed position relative to the other nodes.

For example, node A transmits a signal with a destination address indicating node F. The signal is received by nodes B, C, and D over wireless links 102. Each of nodes B, C, and D in turn retransmit the received signal which is then received by nodes E and F. Node E then retransmits the received signal which is received by node F. Node F, in this example, received the signal originally transmitted by node A via intermediate nodes in each of 3 separate wireless paths. As used herein, an intermediate node is a node located in the wireless path, between the original node and the destination node, which forwards the received wireless signal. Additionally, a wireless path is the path a wireless signal travels from an original node to a destination node.

The first wireless path in this example includes nodes A, B and F, (node B being an intermediate node, node A being the transmitting or original node, and node F being the destination node). The second wireless path includes nodes A, C, and F and the third wireless path includes nodes A, D, E, and F. The portion of a wireless path between two nodes is referred to herein as a wireless segment. For example, the portion of the first wireless path between nodes A and B is the first segment of the first wireless path.

In some embodiments, the destination node, node F in this example, implements a voting scheme based on the received wireless signal input from the plurality of wireless paths. For example, if the received wireless signal from the first wireless path is the same as the received wireless signal from the third wireless path, but different from the wireless signal received from the second wireless path, the destination node selects the signal received from the first and third wireless paths. It is to be understood that this exemplary voting scheme is provided by way of example and that other voting schemes based on received input from the plurality of wireless paths can be implemented in other embodiments.

Furthermore, in some embodiments, a voting scheme is not implemented. In such embodiments, a default order is determined a priori to determine which signal to use. For example, in FIG. 1A, node F can be assigned a priori to use the signal received over the first wireless path unless it is unavailable. If it is unavailable, the wireless signal received over the second wireless path is to be used. It is to be understood that other a priori schemes can be used in other embodiments. However, by using multiple paths (route diversity), system 100 is able to tolerate transmission failures in a given wireless path, such as failures due to environmental noise, jamming, node failure or other interference.

Figure 1B:
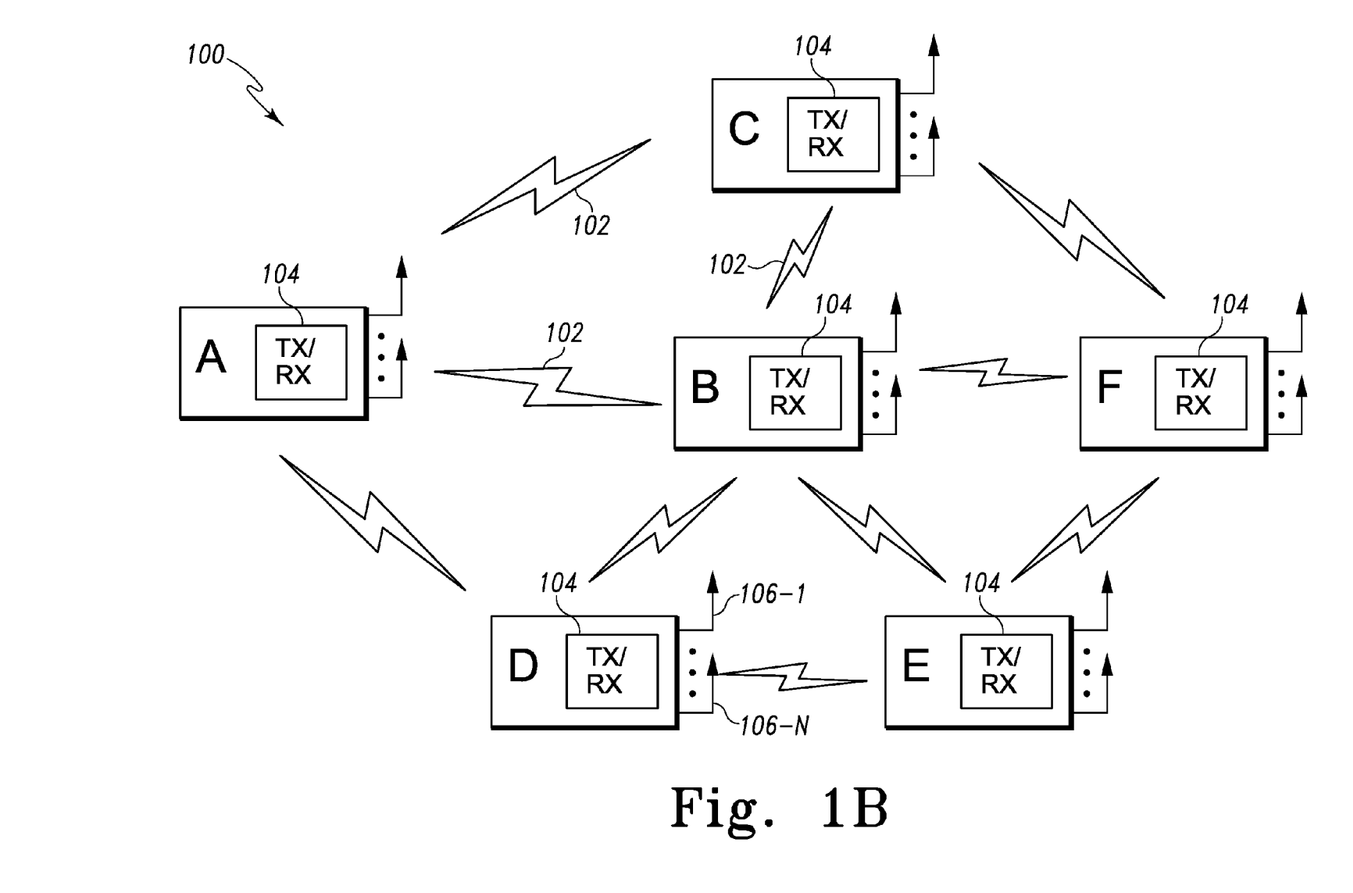

In addition, in some embodiments, each of nodes A-F includes a plurality of antennae 106-1 ... 106-N for transmission and reception, as shown in FIG. 1B. In particular, each of nodes A-F in FIG. 1B is operable to simultaneously transmit and receive multiple copies of a wireless signal (one for each antenna 106) through implementation of a Multiple-Input Multiple-Output (MIMO) scheme. In particular, in this example, the MIMO scheme is used to increase the signal gain at the destination node, thereby reducing multipath fading effects. Each of antennae 106-1 ... 106-N are operable to transmit on different channels. As used herein, a channel refers to a range of frequencies.

In some such embodiments, each of nodes A-F is operable to dynamically select a coding technique for each channel. Exemplary coding techniques include, but are not limited to, Reed-Solomon coding, convolution coding, and BCH coding. Each coding technique has advantages under certain conditions. Hence, each of nodes A-F selects an appropriate coding technique for each channel based on the conditions of the respective channel. For example, in some embodiments, the coding technique for each channel is selected based on the worst bit error rate of the respective channel.

Furthermore, in some embodiments, the wireless signal from the original node is transmitted over the same channel for each segment. In other embodiments, the wireless signal from the original node is transmitted over a different channel for each segment of the wireless path. In addition, in some embodiments with more than one antenna 106, each antenna transmits the wireless signal at a different channel as discussed above and shown in FIG. 2A (also referred to as link diversity). The black rectangles represent channels (CH1 to CHn) being used at a given moment in time. In the example shown in FIG. 2A, three separate channels are used simultaneously. The channels are separate enough to be independent of one another so that interference in one channel does not influence the other channels. The total number of channels to use is determined based on a worst case estimate of potential interference. For example, if it is estimated that a jammer can jam 3 channels at any given moment in time, 4 or more channels are used to transmit wireless signals between nodes A-F.

Figure 2A:
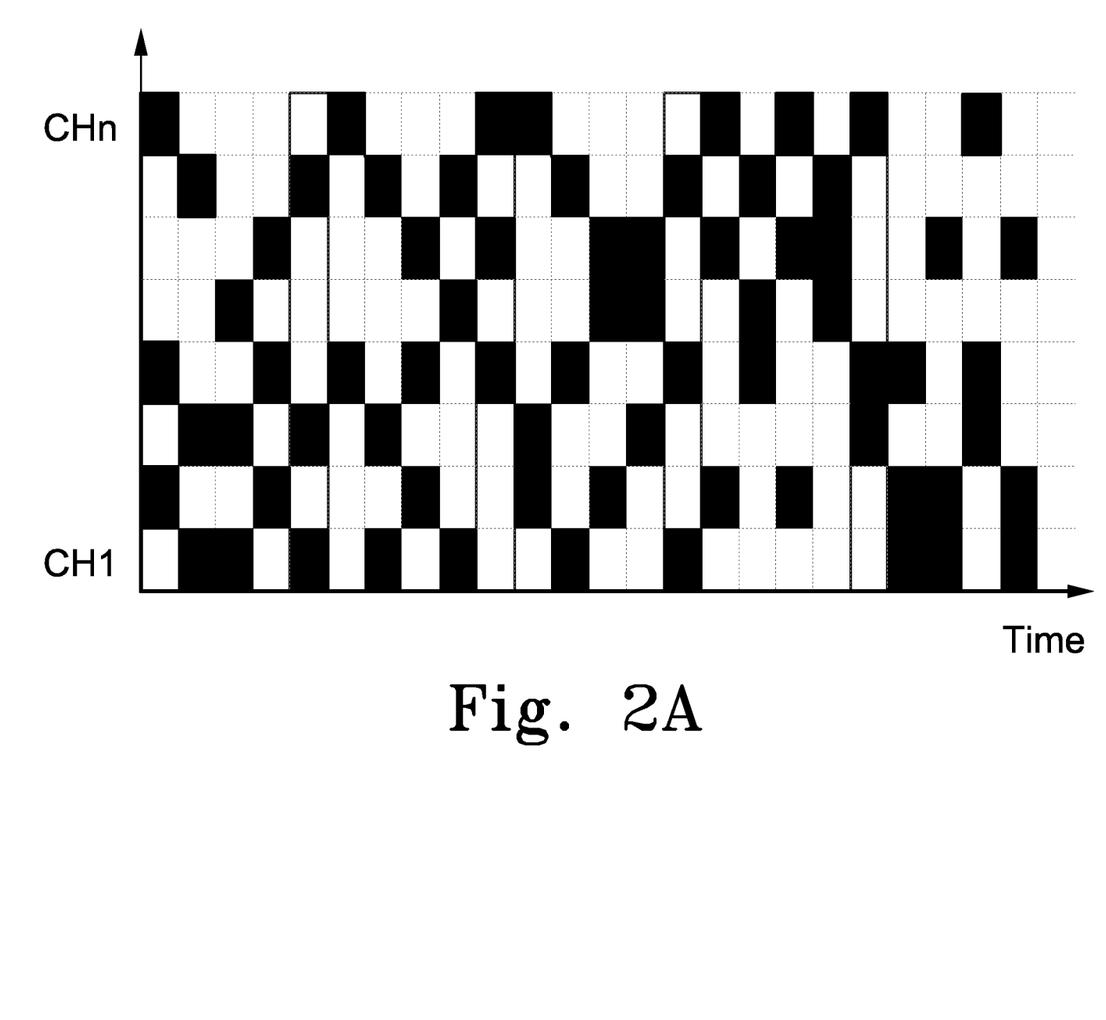

Additionally, as shown in the example in FIG. 2A, in some embodiments, each antenna pseudo-randomly switches the channel over which it transmits data. In particular, in some embodiments, a Frequency Hopping Spread Spectrum (FHSS) technique is used for each antenna. The hopping sequence is determined a-priori in some embodiments. In other embodiments, a pseudo-random number generator in each node is used to determine the hopping sequence. Furthermore, in some embodiments, a Direct Sequence Spread Spectrum (DSSS) technique is used in each channel.

Figure 2B:
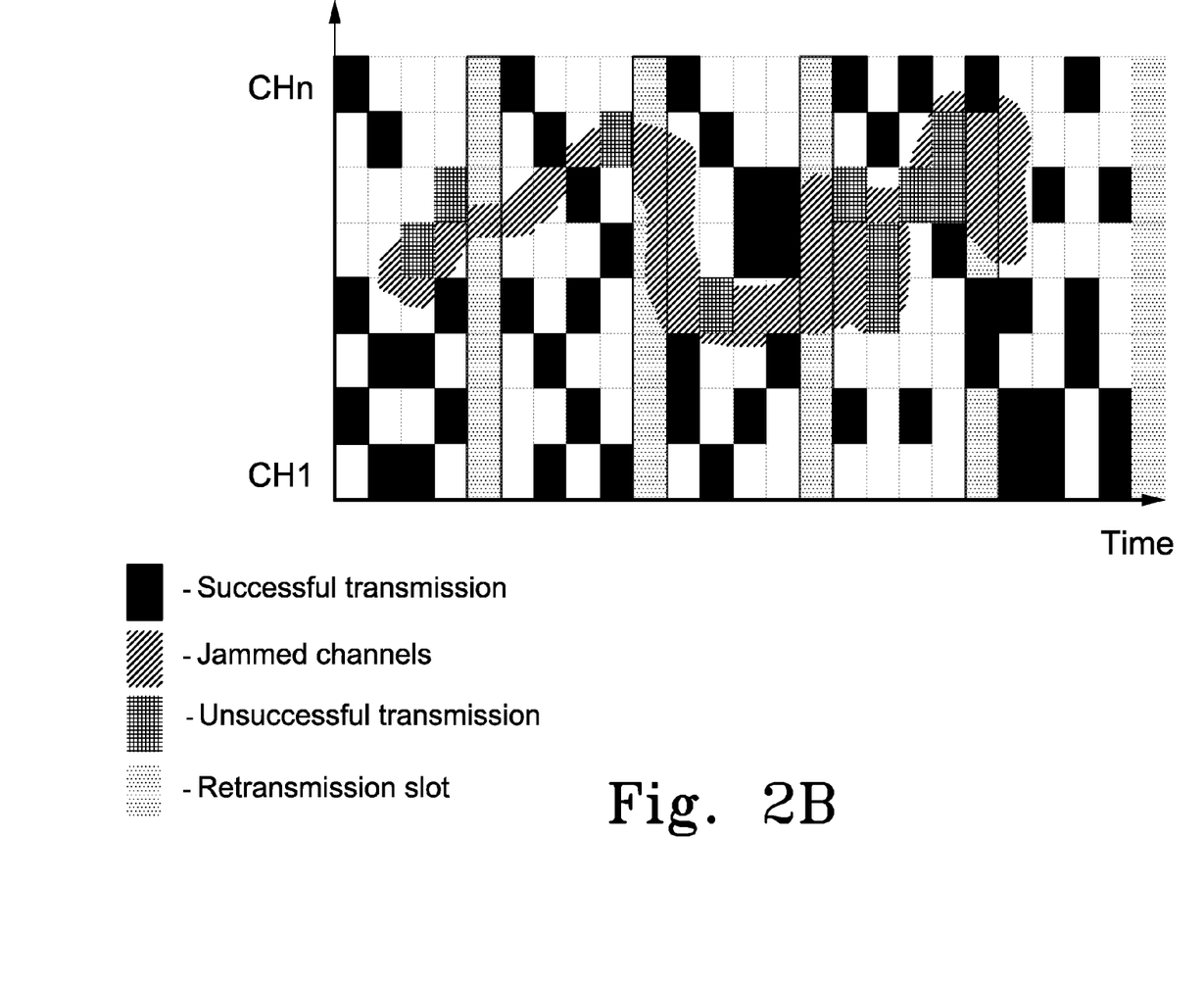

FIG. 2B shows the effect of jamming (either intentional or unintentional) on the transmission channels of FIG. 2A. As shown in FIG. 2B, even though jamming causes some channels to periodically have unsuccessful transmissions, at least one successful transmission is completed at each moment in time. In addition, in the example shown in FIG. 2B, a TDMA schedule is used. In the TDMA schedule a time slot is periodically reserved for retransmission of unsuccessful transmissions. Thus, by retransmitting any unsuccessful transmissions, the reliability of system 100 is further improved. In addition, retransmission slots are used in some embodiments to transmit parity bits.

Figure 3:
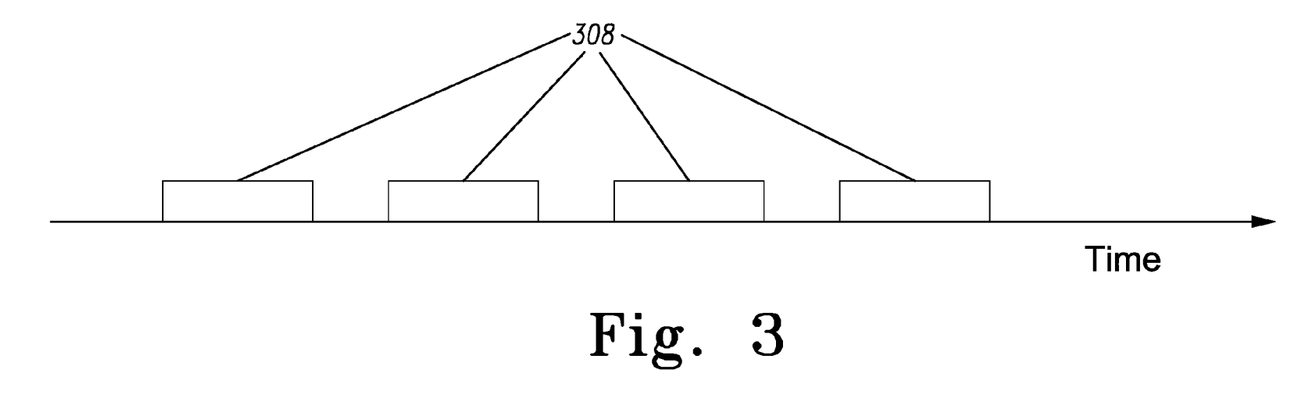
Figure 4:
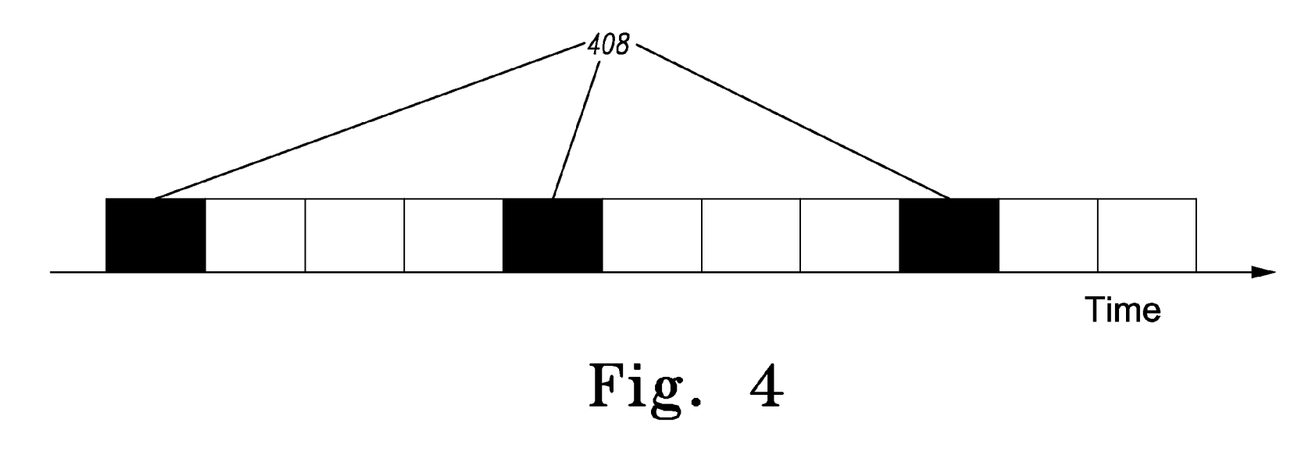

In addition, to retransmitting unsuccessful transmissions, in some embodiments, multiple copies of each signal are transmitted at distinct moments in time as depicted in FIG. 3. As shown in FIG. 3, four separate copies of the same signal 308 are transmitted at distinct moments in time regardless of whether or not the first transmission was determined to be successful (also referred to as time diversity). For example, as stated above and shown in FIG. 4, in some embodiments a TDMA schedule is used. In FIG. 4, the same signal 408 is transmitted in three distinct time slots. Other signals originating from the same node or other nodes are transmitted in the other time slots. By transmitting multiple copies at distinct moments in time, corruption of the signal received by the destination node due to temporary interference is mitigated.

Figure 5:
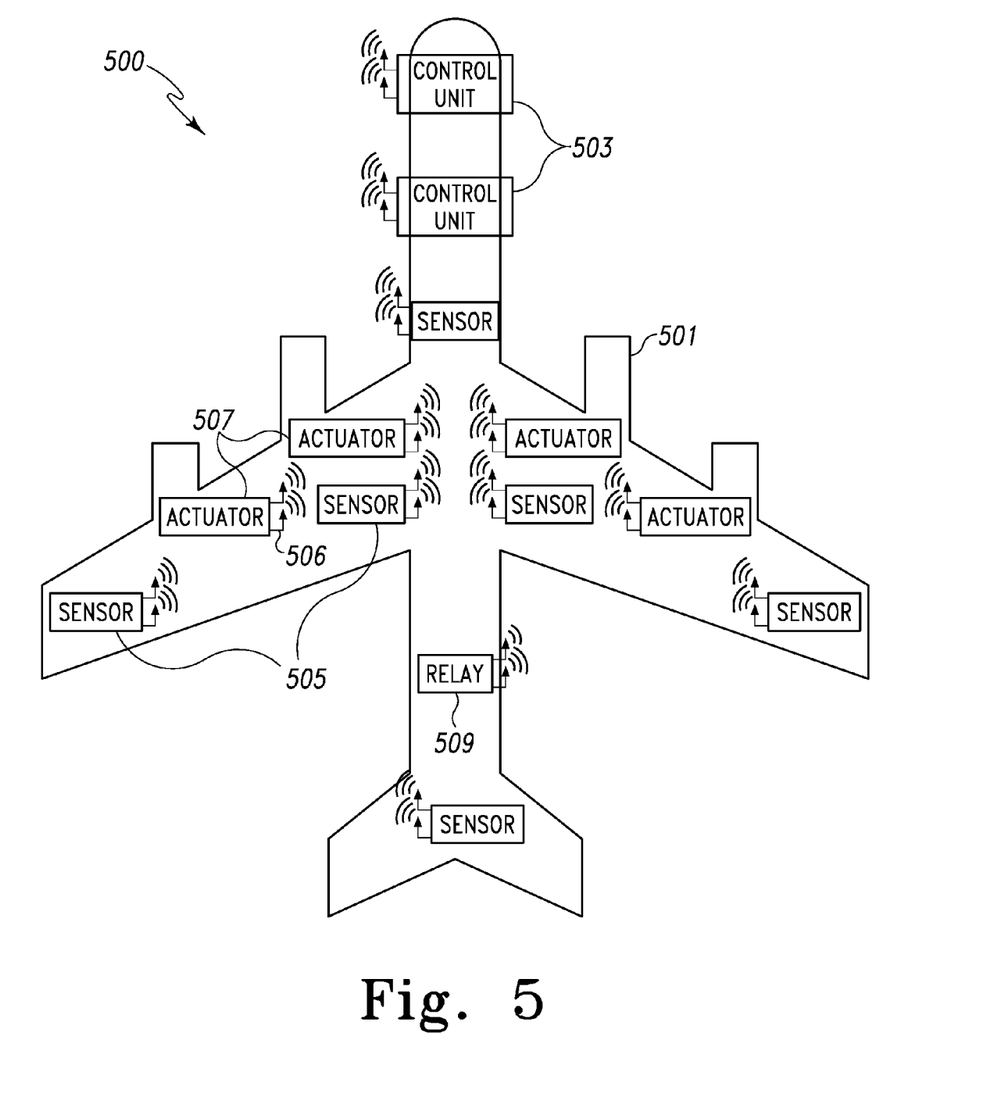

FIG. 5 depicts one embodiment of a wireless communication system 500 implemented in an aircraft 501. Notably, system 500 is provided by way of example and not by way of limitation. In particular, other embodiments of wireless communication systems as described herein can be implemented in other environments, such as, but not limited to, ground vehicles, control plants, etc. System 500 comprises four types of nodes, control unit 503, sensor 505, actuator 507, and relay 509. In particular, system 500 includes one or more control units 503 operable to process data from a plurality of sensors 505 and output commands or control signals to other nodes.

The sensors 505 are operable to obtain data regarding operation of the aircraft 501. For example, sensors 505 can include, but are not limited to, engine sensors, wing flap sensors, navigation sensors, etc. System 500 also includes a plurality of actuators 507 operable to adjust operation of aircraft 501 based on commands received from control units 503. For example, actuators 507 can adjust engine throttle, apply brakes, adjust wing flap position, etc. System 500 also optionally includes one or more relays 509 to provide additional wireless paths, thereby increasing the reliability of system 500 and/or enabling otherwise isolated nodes to communicate wirelessly in system 500. For example, if a node is not within range of other nodes, one or more relays 509 can be included to enable communication with that node from other nodes in system 500.

In one embodiment, each of control units 503, sensors 505, actuators 507, and relay 509 comprise a plurality of antennae 506 and are located in a fixed position relative to each other. System 500 implements one or more of the techniques for route diversity, link diversity and time diversity as discussed above with respect to FIGS. 1-4. In particular, each of control units 503, sensors 505, actuators 507, and relay 509 are operable to transmit a signal to another destination node via multiple wireless paths and over a plurality of channels. In addition, each of control units 503, sensors 505, actuators 507, and relay 509 are operable to pseudo-randomly switch transmission channels and to transmit multiple copies of a wireless signal at distinct moments in time as discussed above.

Figure 6:
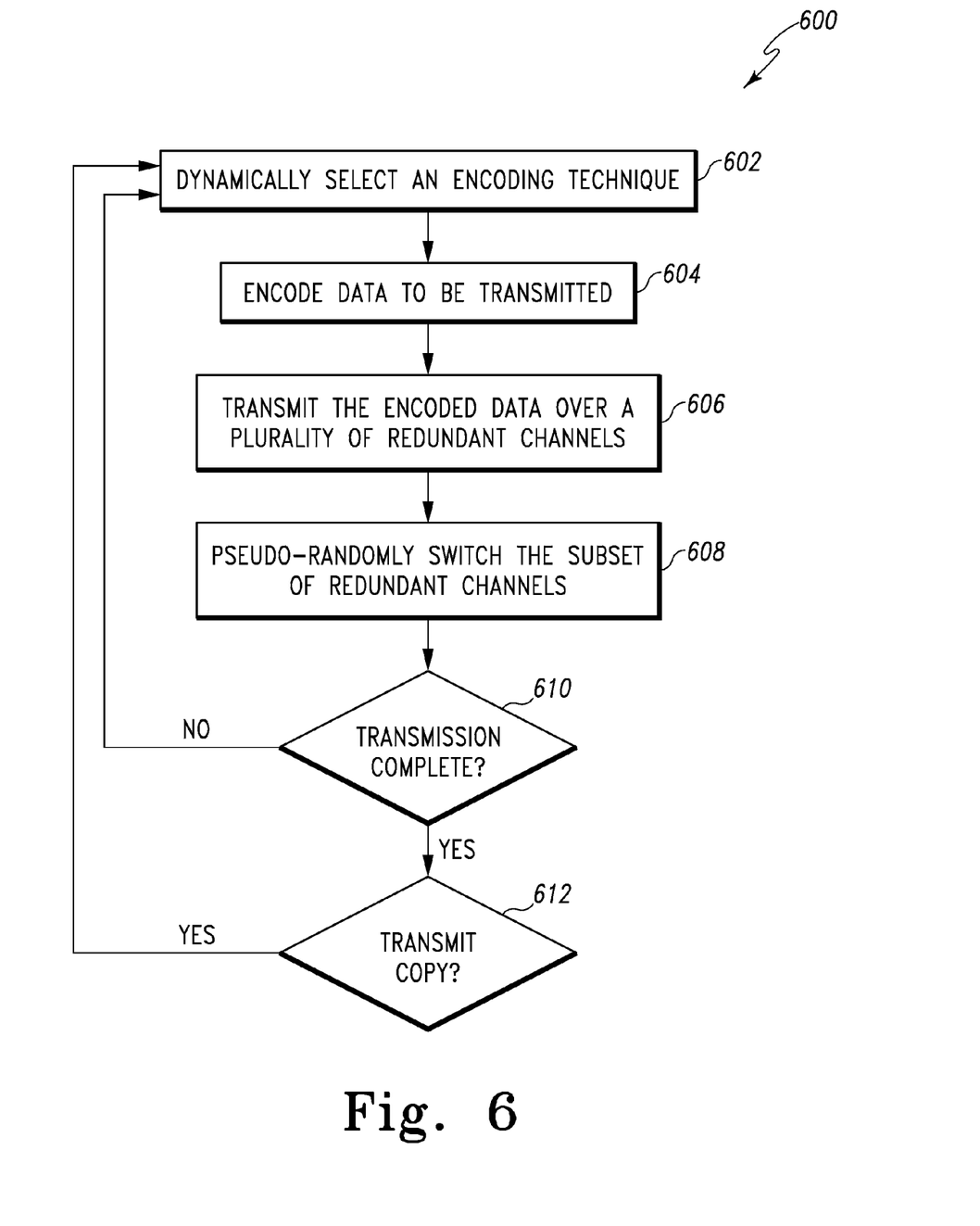

FIG. 6 is a flow chart of one embodiment of a method 600 of communicating in a wireless communication system, such as system 100 above. In particular, method 600 is implemented in a node such as nodes A-F discussed above. At 602, the node dynamically selects an encoding technique from a plurality of available encoding techniques. In particular, the node dynamically selects an encoding technique for each of a plurality of channels over which data is to be transmitted. The encoding technique is selected for each channel based on conditions of the channel. For example, in some embodiments, the encoding technique is selected based on the worst bit error rate (BER) of the respective channel. In addition, the data to be transmitted can be data originating from the node or data received from another node which is being forwarded in a wireless path.

At 604, the node encodes the data to be transmitted using the selected encoding technique. At 606, the node transmits the encoded data over the plurality of channels to each of a plurality of intermediate nodes. An intermediate node is a node located in the wireless path between the original node and the destination node. The number of channels over which the data is transmitted is determined, in some embodiments, based on a worst case estimate of potential interference, such as jamming and environmental noise. In addition, in some embodiments, transmitting the encoded data includes transmitting the data according to a TDMA schedule. In other embodiments, transmitting the encoded data includes transmitting the encoded data using CSMA or CDMA techniques.

At 608, the node pseudo-randomly switches the channels over which the data is being transmitted as described above. At 610, the node determines if the transmission of the data is complete. In other words, the node determines if any bits of the data remain to be transmitted. For example, in some embodiments, the node switches channels after each bit. In such embodiments, each bit is transmitted on a new channel with an encoding technique selected for its respective channel. If transmission of the data is not complete, method 600 returns to 602, where an encoding technique is selected for each new channel. If transmission of the data is complete (e.g. all bits have been transmitted), the node determines, at 612, if additional copies of the data remain to be sent. As discussed above, each node transmits multiple copies of the same data at distinct moments in time, in some embodiments. If additional copies are to be transmitted, method 600 returns to 602, where an encoding technique is selected for each new channel.

While the embodiments disclosed have been described in the context of a communications network, apparatus embodying these techniques are capable of being distributed in the form of a machine-readable medium of instructions and a variety of program products that apply equally regardless of the particular type of signal bearing media actually used to carry out the distribution. Examples of machine-readable media include recordable-type media, such as a portable memory device; a hard disk drive (HDD); a random-access memory (RAM); a read-only memory (ROM); transmission-type media, such as digital and analog communications links; and wired or wireless communications links using transmission forms, such as radio frequency and light wave transmissions. The variety of program products may take the form of coded formats that are decoded for actual use in a particular communications network by a combination of digital electronic circuitry and software residing in a programmable processor (for example, a special-purpose processor or a general-purpose processor in a computer). In one example embodiment, the programmable processing unit of the communications node comprises at least one of a microprocessor, a microcontroller, a field-programmable gate array (FPGA), a field-programmable object array (FPOA), a programmable logic device (PLD), or an application-specific integrated circuit (ASIC).

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the embodiments described herein. Therefore, it is manifestly intended that the embodiments be limited only by the claims and the equivalents thereof.

What is claimed is:

1. A wireless communication system comprising:
one or more control units operable to transmit control signals;
a plurality of actuators responsive to the control signals;
a plurality of sensors operable to transmit sensor data used by the one or more control units in generating the control signals;
wherein each of the sensors, actuators, and one or more control units are located at a fixed position in the system relative to one another;
wherein each of the plurality of sensors and each of the plurality of actuators are coupled to at least one of the one or more control units via a plurality of wireless paths;
wherein each of the plurality of sensors are operable to transmit the sensor data in an assigned time slot to at least one of the one or more control units over a plurality of wireless channels in each of the plurality of wireless paths;
wherein the number of channels in each of the plurality of wireless paths is determined based, at least in part, on a worst-case estimate of potential interference; and
wherein each of the plurality of sensors is operable to pseudo-randomly switch the plurality of channels over which the sensor data is transmitted.

2. The wireless communication system of claim 1, wherein each of the plurality of sensors is operable to transmit a copy of the sensor data in each of a plurality of assigned time slots.

3. The wireless communication system of claim 1, wherein each of the plurality of sensors is operable to select an encoding technique for each of the plurality of channels based on a worst bit error rate for each channel.

4. The wireless communication system of claim 3, wherein each of the plurality of sensors is operable to select one of a Reed-Solomon encoding technique, a convolution encoding technique, and a BCH encoding technique.

5. The wireless communication system of claim 3, wherein each of the plurality of sensors is operable to transmit the sensor data using a direct sequence spread spectrum (DSSS) technique for each of the plurality of channels.

6. The wireless communication system of claim 1, wherein each of the plurality of sensors is operable to pseudo-randomly switch the channels over which the sensor data is transmitted after each bit of the sensor data is transmitted.

7. The wireless communication system of claim 1, wherein each of the one or more control units is operable to implement a voting scheme based on the sensor data received over each of the plurality of wireless paths.

8. A wireless communication system comprising:
a plurality of nodes, each of the plurality of nodes coupled to a plurality of the other nodes via corresponding wireless links;
wherein each of the nodes is located at a fixed position in the system relative to the other nodes;
wherein each of the plurality of nodes is operable to transmit a wireless signal over a plurality of channels to a destination node of the plurality of nodes via one or more other nodes in each of a plurality of wireless paths, each wireless path comprising at least one segment;
wherein the number of channels in each of the plurality of wireless paths is determined based, at least in part, on an estimate of potential interference;
wherein each other node in each wireless path is operable to forward the received wireless signal;
wherein each of the plurality of nodes is further operable to pseudo-randomly switch the channels over which the wireless signal is transmitted; and
wherein each of the plurality of nodes is operable to transmit redundant copies of the wireless signal at different moments in time.

9. The wireless communication system of claim 8, wherein each of the plurality of nodes is operable to pseudo-randomly switch the channels over which the wireless signal is transmitted.

10. The wireless communication system of claim 8, wherein each of the plurality of nodes is operable to transmit the wireless signal according to a Time Division Multiple Access (TDMA) schedule.

11. The wireless communication system of claim 8, wherein each of the plurality of nodes are operable to retransmit unsuccessful transmissions for each channel.

12. The wireless communication system of claim 8, wherein each of the plurality of nodes is operable to select an encoding technique for each of the plurality of channels.

13. The wireless communication system of claim 12, wherein each of the plurality of nodes is operable to select an encoding technique for each of the plurality of channels based on a worst bit error rate for each channel.

14. The wireless communication system of claim 12, wherein each of the plurality of nodes is operable to select one of a Reed-Solomon encoding technique, a convolution encoding technique, and a BCH encoding technique.

15. The wireless communication system of claim 8, wherein each of the plurality of nodes is operable to transmit the wireless signal using a direct sequence spread spectrum (DSSS) technique for each of the plurality of channels.

16. The wireless communication system of claim 8, wherein the destination node is operable to implement a voting scheme based on the wireless signal received over each of the plurality of wireless paths.

* * * * *